United States Patent

Wu

[11] Patent Number: 5,890,263
[45] Date of Patent: Apr. 6, 1999

[54] SPLIT LOCKABLE HINGE FOR A BABY BED

[76] Inventor: Sung-Tsun Wu, 8F-1, No. 249 Chung Ching Road, Pan Chiao City, Taipei Hsien, Taiwan

[21] Appl. No.: 79,332

[22] Filed: May 14, 1998

Related U.S. Application Data

[63] Continuation-in-part of Ser. No. 3,743, Jan. 7, 1998, abandoned.

[51] Int. Cl.$^6$ ............................. F16C 11/10; E05D 11/00; A47D 7/00
[52] U.S. Cl. ........................ 16/324; 16/326; 16/DIG. 29; 5/99.1
[58] Field of Search ........................ 5/99.1, 98.1; 16/324, 16/326, DIG. 29

[56] References Cited

U.S. PATENT DOCUMENTS

| | | | |
|---|---|---|---|
| 4,602,889 | 7/1986 | Mu-Shan | 16/326 |
| 4,787,121 | 11/1988 | Racenis et al. | 16/DIG. 29 |
| 5,142,739 | 9/1992 | Lin | 16/326 |

*Primary Examiner*—Alex Grosz

[57] ABSTRACT

A split lockable hinge for a baby bed containing a first hinge wing, a second hinge wing and a lock. An outer and inner legs respectively extend downward from the first and second hinge wings. The lock comprises a plurality of receiving holes on the first hinge wing, a plurality of hooking slots on the second hinge wing which can engage the engaging pin which can be inserted through the receiving holes and the hooking slots, and a plurality of elastic members. The first hinge wing is locked to the second hinge wing by the engagement of the engaging pin to the hooking slots of the second hinge wing by the elastic force of the elastic members. The operation of the split lockable hinge is easier and more stable. The structure of it is easily made. It is easier to arrange the cloth of the baby bed and the volume of the collapsed bed is reduced after collapsing because the rod members can rotate about their long axes. With the split lockable hinge, the jumping dismantling action will not occur.

7 Claims, 6 Drawing Sheets

SPLIT LOCKABLE HINGE FOR A BABY BED

This is a continuation-in-part application of a pending application Ser. No. 09/003,743, entitled "Pivotable Connection Structure for a Baby Bed", filed Jan. 7, 1998 now abandoned.

FIELD OF THE INVENTION

The present invention relates to a split lockable hinge for a baby bed, particularly to a split lock hinge which controls the extension and collapsing action of the frames and rod members. The operation of the split lockable hinge is easy and stable. Its structure is easily made. When the frames and rod members of baby bed are extended, the split lockable hinge can limit the extent of the action of the baby bed during extension to prevent jumping collapsing action from occurring. It is easier to arrange the cloth of the baby bed and the volume of the dismantled baby bed is reduced after collapsing because the rod members are rotatable about their long axes.

BACKGROUND OF THE INVENTION

In the conventional baby bed structure, a plurality of folding dismantling members are disposed on the four sides of the frames of the baby bed. When the pushing buttons of the folding dismantling members are pressed, the engaging elements of the folding dismantling members are retreating into the folding dismantling members so that the frames can be folded and dismantled. A well-known connection head for pivotably connecting to the frames is disposed at the bottom of the baby bed. The above well-known connection head comprises a fixing seat and a removable seat which is pivotably mounted to the fixing seat. Several supporting rods are pivotably disposed at both sides of the fixing seat. Several dismantling rods are pivotably disposed at the opposite sides of the removable seat. Several securing pins are disposed at the other opposite sides of the removable seat. Elastic components are arranged on the suitable location of the dismantling rod and the supporting rods, so that the removable seat can be rotated when the supporting rods and the dismantling rods extending on the same plane. The securing pins are disposed on the supporting rods so that the supporting rods and dismantling rods simultaneously support and secure the baby bed. When the removable seat is rotated and the securing pin is dismantled from the supporting rods, the supporting rods and dismantling rods are simultaneously folded and dismantled by the elastic force of the elastic components.

However, the structure of the connection head of the well-known baby bed is quite complex, and therefore the product cost is high. It is not convenient to assemble and the stability of the structure is not good. When the securing pins of the baby bed are touched by a user or a third person, the frames of the baby bed are abruptly and erroneously dismantled and folded, i.e., the so-called bad jumping dismantling action, which easily hurt the user or the baby, will occur. Further, the cloth on the walls and bed of the baby bed is too loose to be compactly folded into a minimum volume. Thus, it is difficult for the user to further fold the baby bed.

SUMMARY OF THE INVENTION

It is an objective of the present invention to provide a split lockable hinge for a baby bed which comprises a first hinge wing and a second hinge wing hinged to the first hinge wing. The first hinge wing is fixed and hinged to the second hinge wing by a hinge pin. In one embodiment of the present invention, the lock comprises an engaging pin movable by elastic force to lock the first hinge wing to the second hinge wing. The engagement of the engaging pin can control hinge movement of the first hinge wing about the hinge pin also engaging the second hinge wing so as to increase the working stability of the baby bed and to decrease the production cost. The split lockable hinge is easily operated.

It is another objective of the present invention to provide a split lockable hinge for a baby bed in association with rods having elongated slots formed at the end of each of the rods. The rods fit into sockets located in the first and second hinge wings. Vertical pins connect the rods to the socket and are placed through the vertical pins and the elongated slots. The vertical pins and the elongated slots enable the rod members to sweep horizontally around the vertical pins and to slightly rotate around their long axes. The connections between the rods and the split lockable hinge facilitate the arrangement of the bed sheet during the operation of the split lockable hinge. The volume of the collapsed baby bed is decreased to a minimum one.

It is another objective of the present invention to provide a split lockable hinge for a baby bed comprising the first hinge wing and the second hinge wing. A pair of outer legs extend downward from the first hinge wing and a pair of the inner legs extend downward from the second hinge wing. The inner legs can be inserted into and connected to the outer legs to form one structure. The receiving holes, into each of which an engaging pins can be inserted, are respectively formed on the second hinge wing. Two hooking slots are respectively formed on the second hinge wing. Two elastic members are respectively disposed between the engaging pin and the hinge pin, along the axis of which the outer legs hingeably rotate about the inner legs. By the drawing elastic force of the elastic member on the engaging pin, the engaging pin is slid and engaged into the hooking slot. When the rod members are assembled and when the first hinge wing closes into the second hinge wing, the first hinge wing becomes fixed to the second hinge wing. When a grasping tab attached to the engaging pin is pulled upward, the engaging pin is separated from and moved out of the hooking slot so that the first hinge wing can be opened out from the second hinge wing to collapse the baby bed. The four rod members which are connected with vertical pins to the first and second hinge wings respectively have elongated slots in their ends through which the vertical pins are placed. As the baby bed is collapsed, the rod members can sweep horizontally about the axes of the vertical pins to reduce the space occupied by the collapsed baby bed.

BRIEF DESCRIPTIONS OF THE DRAWINGS

DETAILED DESCRIPTIONS OF THE INVENTION

Figure 1:
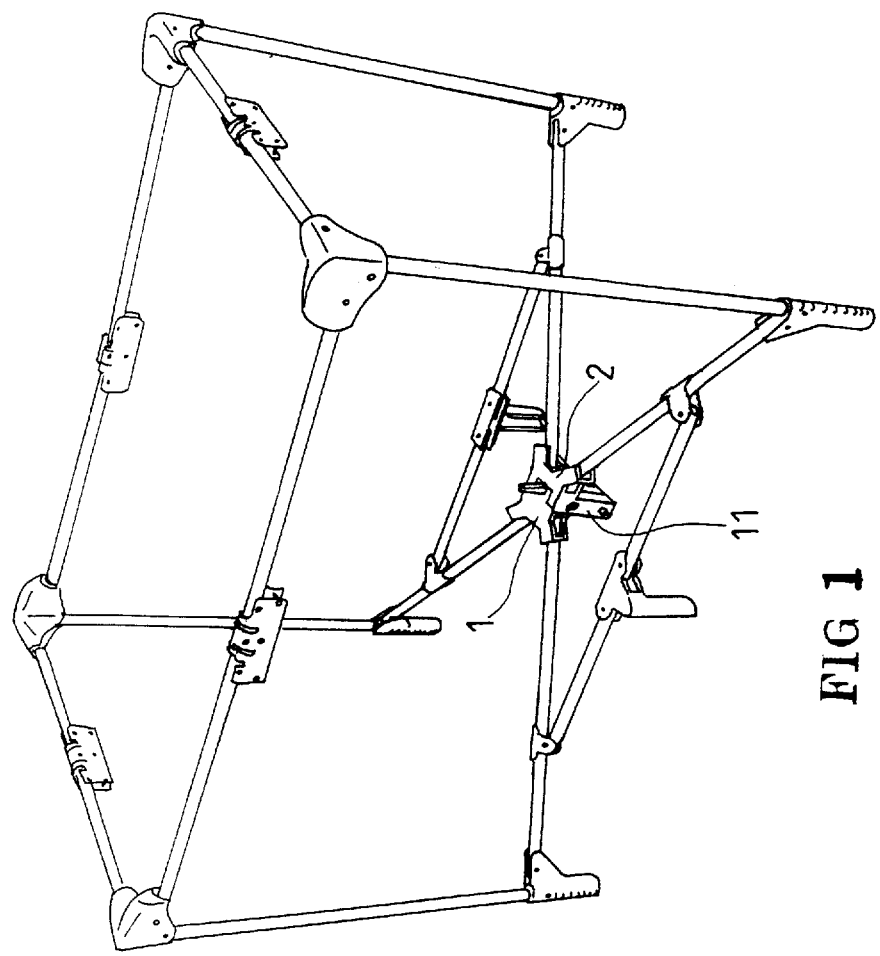
FIG. 1 is a three-dimensional view of the baby bed of the present invention.
Figure 2:
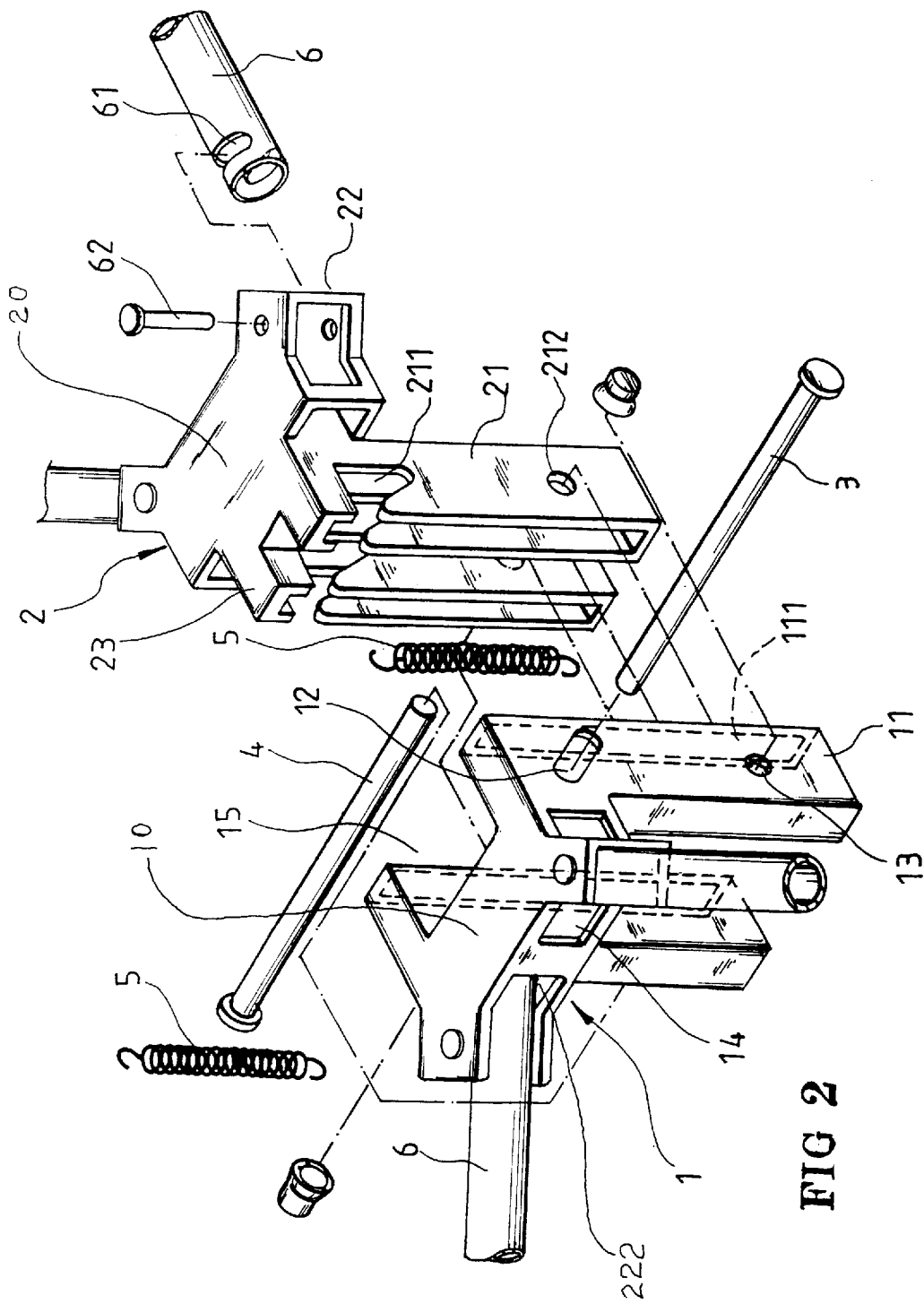
FIG. 2 is an exploded view of the split lockable hinge for a baby bed of the present invention.

As shown in FIG. 1, the split lockable hinge of the present invention is mounted below the bed of the baby bed. As shown in FIG. 2, the split lockable hinge of the present invention comprises the first hinge wing 1, the second hinge wing 2, the engaging pin 3, the hinge pin 4, and a plurality of elastic members 5. A pair of the outer legs 11 extend downward from the body 10 of the first hinge wing 1. A pair of receiving space 111 is formed in the outer legs 11. A notch 15 is formed on the upper part of the body 10 of the first hinge wing 1. A pair of slant receiving holes 12 and hinge pin holes 13 are formed at the suitable location of outer legs 11. A pair of openings 14 are formed on one end of the outer legs 11. A pair of inner legs 21 extend downward from the second body 20 of the second hinge wing. A notch 15, into which a pair of protruding members 23 and the inner legs 21 can be inserted, is formed on the upper part of the first body 10 of the first hinge wing 1. A pair of slant hooking slots 211 are respectively formed on the upper part of the inner legs 21. A pair of inner hinge pin holes 212 are respectively formed on the lower part of the inner legs 21. The location of the inner hinge pin holes 212 is at a corresponding place to the location of hinge pin holes 13 of the first hinge wing 1. A pair of sockets 22 for receiving the rod members 6 are formed on both sides of the second body 20.

Figure 5:
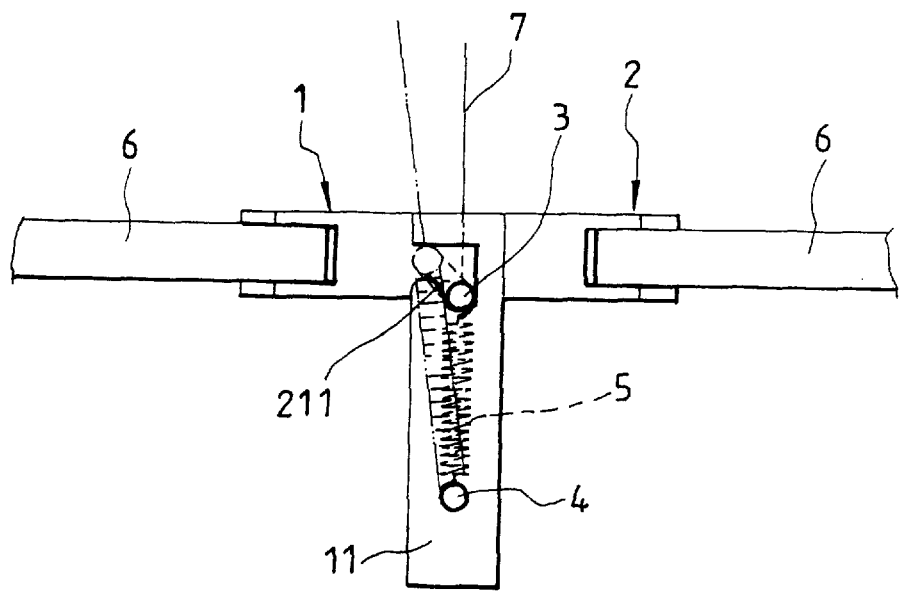
FIG. 5 is a schematic side view of the split lockable hinge of the present invention showing that the engaging pin is just moved into the hooking slot.
Figure 7:
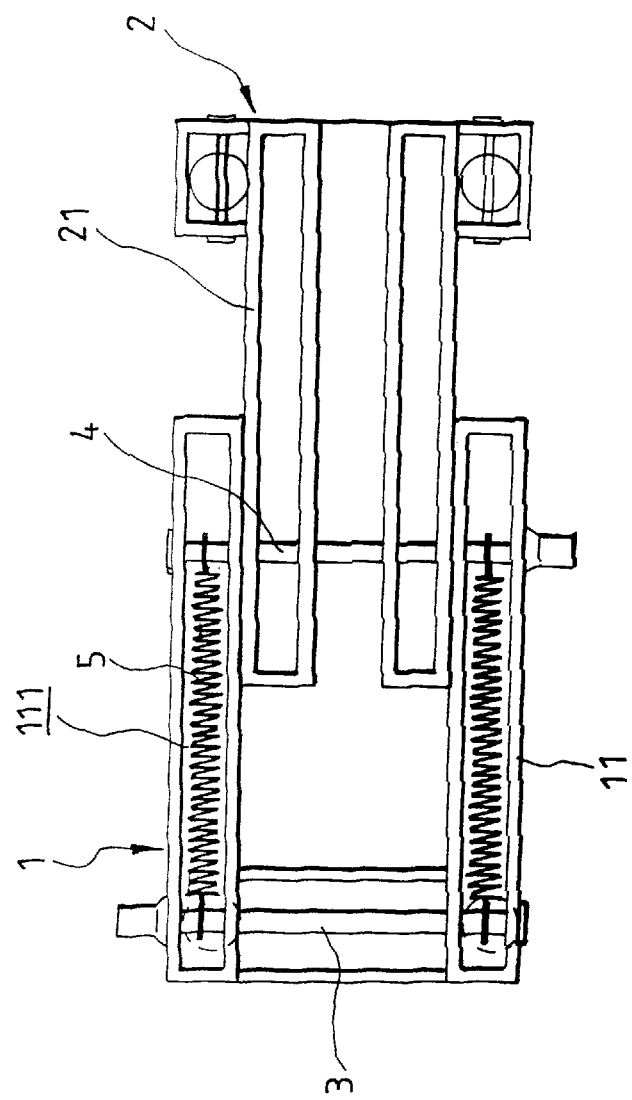
FIG. 7 is a top view of FIG. 6.

The hinge pin 4 is inserted into the hinge pin holes 13 of the first hinge wing 1 and into the inner hinge pin holes 212 of the second hinge wing 2 so that the first hinge wing 1 is hinged on the second hinge wing 2 along the axis of the hinge pin 4. After the second hinge pin 2 is inserted and received into the first hinge wing 1, the pair of inner legs 21 are overlapped on the pair of outer legs 11. Further, an engaging pin 3 is inserted into the pair of receiving holes 12 of the first hinge wing 1. One end of the elastic members 5 is fixed on the hinge pin 4 and the other end of the elastic members 5 is fixed on the engaging pin 3. The pair of the elastic members 5 are received in the receiving space 111 of the outer legs 11 so as to improve the beauty of the appearance as shown in FIG. 7. The engaging pin 3, which is inserted in the receiving holes 12, is drawn downward by the elastic drawing force of the elastic members 5. This mechanism forms the hinge lock. An elongated slot 61 is respectively formed at the ends of the four rod member 6 which are movably fitted to the split lockable hinge of the present invention. The rod members 6 are inserted into the first sockets 222 of the first hinge wing 1 or second sockets 22 of the second hinge wing 2, and enter the openings 14 of the first hinge wing 1 and second hinge wing 2. The ends of the rod members 6 are connected to the first and second hinge wings 1 and 2 by inserting four vertical pins 62 through the four elongated slots 61 as shown in FIG. 3 and FIG. 5.

Figure 3:
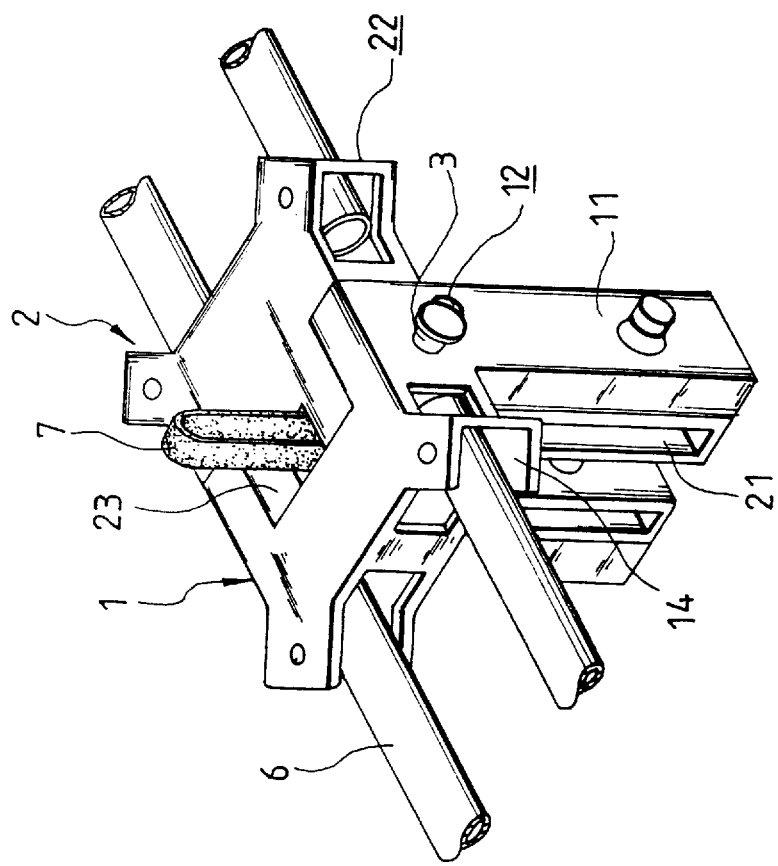
FIG. 3 is a three-dimensional view of the split lockable hinge for a baby bed of the present invention.
Figure 4:
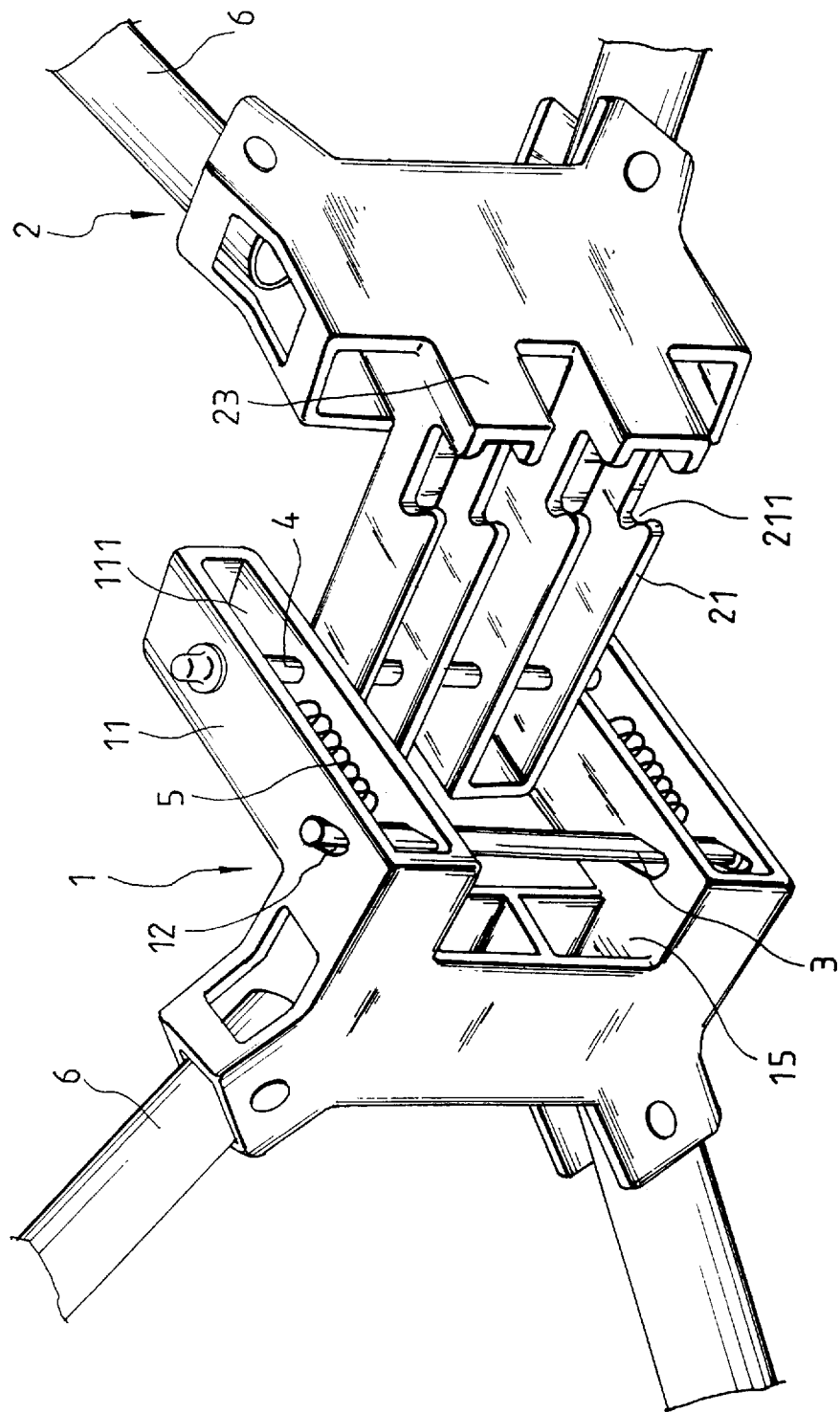
FIG. 4 is a three-dimensional view of the split lockable hinge for a baby bed of the present invention showing that the engaging pin is out of the hooking slot.
Figure 6:
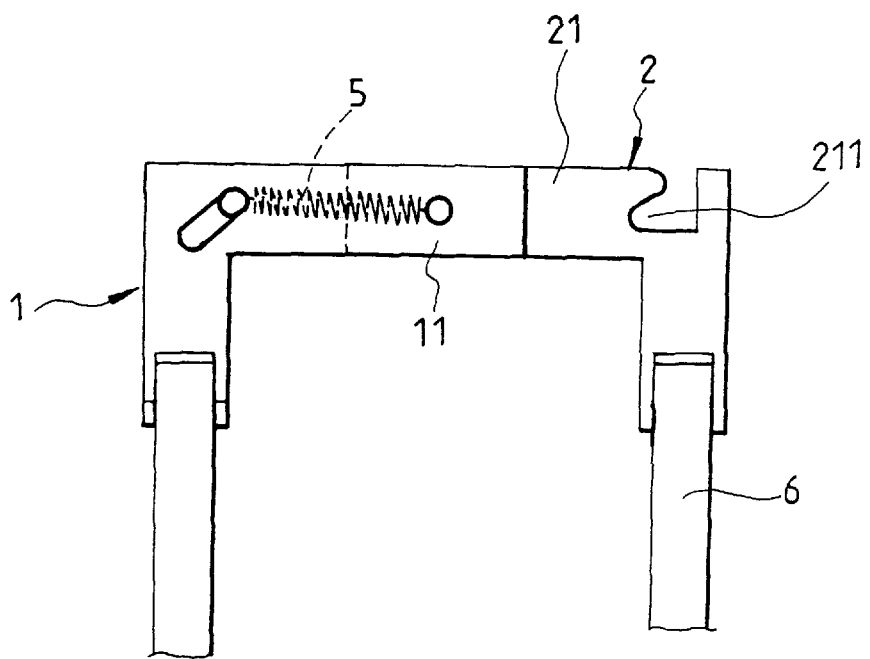
FIG. 6 is a schematic side view of the split lockable hinge of the present invention showing that the engaging pin is moved out of the hooking slot.

By means of the above structure, a grasp tab 7 is disposed and fixed to the engaging pin 3 as shown in FIG. 3. When a user draws the grasp tab 7 upward, the engaging pin 3 is pulled out of the hooking slots 211 of the second hinge wing 2. Thus, the first body 10 is separated from the second body 20 by opening the first hinge wing 1 relative to the second hinge wing 2 by rotating around the axis of hinge pin 4 as shown in FIGS. 4 and 6. When a user wants to engage the first body 10 to the second body 20, he pushes the engaging pin 3 to be inserted into the hooking slot 211 by the elastic force of the elastic members 5 in order to secure the first hinge wing 1 to the second hinge wing 2. The operation and structure of the split lockable hinge are quite simple. Thus, the production cost of it is reduced. Moreover, because the rod members 6 are fitted to this split lockable hinge of the present invention by inserting the vertical pins 62 into the elongated slots 61 of the rod members 6, after the baby bed is collapsed, the rod members 6 can rotate about their long axes to arrange the bed sheet, to reduce the volume occupied by the baby bed and to facilitate storage of the baby bed.

While the invention has been particularly shown and described with reference to three preferred embodiments, it will be understood by those skilled in the art that various changes in form and details may be made throughout without departing from the spirit and scope of the invention. Although only the preferred embodiments of this invention were shown and described in the above description, it is requested that any modification or combination that comes within the spirit of this invention be protected.

What is claimed is:

1. A split lockable hinge for a baby bed comprising:
    a first hinge wing which comprises a plurality of first connecting members for connecting to a plurality of first rod members;
    a second hinge wing which can be inserted into the first hinge wing and which is hinged to the first hinge wing and which comprises a plurality of second connecting members for connecting to a plurality of second rod members; and
    a lock comprising an engaging pin for engaging the first hinge wing to the second hinge wing;
    wherein the first hinge wing comprises a pair of outer legs, a receiving space for receiving the second hinge wing, a pair of first sockets for receiving the first rod members, and a notch for receiving a pair of protruding members on the second hinge wing.

2. A split lockable hinge for a baby bed comprising:
    a first hinge wing which comprises a plurality of first connecting members for connecting to a plurality of first rod members;
    a second hinge wing which can be inserted into the first hinge wing and which is hinged to the first hinge wing and which comprises a plurality of second connecting members for connecting to a plurality of second rod members; and
    a lock comprising an engaging pin for engaging the first hinge wing to the second hinge wing;
    wherein the second hinge wing comprises a pair of inner legs on the second hinge wing, a pair of protruding members which can be received into the first hinge wing, and a pair of second sockets for receiving the second rod members.

3. A split lockable hinge for a baby bed comprising:
    a first hinge wing which comprises a plurality of first connecting members for connecting to a plurality of first rod members;
    a second hinge wing which can be inserted into the first hinge wing and which is hinged to the first hinge wing and which comprises a plurality of second connecting members for connecting to a plurality of second rod members; and
    a lock comprising an engaging pin for engaging the first hinge wing to the second hinge wing;
    wherein the lock comprises a plurality of receiving holes on the first hinge wing, a plurality of hooking slots on the second hinge wing for engaging the engaging pin which is inserted through the receiving holes and the hooking slots after assembling, and a plurality of elastic members for engaging the engaging pins to the hooking slots.

4. A split lockable hinge for a baby bed comprising:

a first hinge wing which comprises a plurality of first connecting members for connecting to a plurality of first rod members;

a second hinge wing which can be inserted into the first hinge wing and which is hinged to the first hinge wing and which comprises a plurality of second connecting members for connecting to a plurality of second rod members; and a lock comprising an engaging pin for engaging the first hinge wing to the second hinge wing;

wherein the first hinge wing and second hinge wing are respectively connected to the first and second rod members by vertical pins.

5. The split lockable hinge for a baby bed as claimed in claim 4 wherein the first connecting member comprises a plurality of first sockets and first vertical pins.

6. The split lockable hinge for a baby bed as claimed in claim 4 wherein the second connecting member comprises a plurality of second sockets and second vertical pins.

7. The split lockable hinge for a baby bed as claimed in any one of claims 1, 2, 3, and 4 wherein the second hinge wing is hinged to the first hinge wing by a hinge pin.

* * * * *